(12) United States Patent
Beven et al.

(10) Patent No.: US 6,274,178 B1
(45) Date of Patent: Aug. 14, 2001

(54) ENHANCEMENT OF INDUSTRIAL ENZYMES

(75) Inventors: Peter William Beven, Armidale; Jeffrey Bruce Wicking, Narromine, both of (AU)

(73) Assignee: Primary Applications Pty. Limited, Moree (AU)

( * ) Notice: Subject to any disclaimer, the term of this patent is extended or adjusted under 35 U.S.C. 154(b) by 0 days.

(21) Appl. No.: 09/424,438

(22) PCT Filed: May 27, 1998

(86) PCT No.: PCT/AU98/00392

§ 371 Date: Jan. 25, 2000

§ 102(e) Date: Jan. 25, 2000

(87) PCT Pub. No.: WO98/54305

PCT Pub. Date: Dec. 3, 1998

(30) Foreign Application Priority Data

May 28, 1997 (AU) .................................................. PO7026
Oct. 28, 1997 (AU) .................................................. PO0056

(51) Int. Cl.[7] .................................................. A23K 1/165
(52) U.S. Cl. ........................... 426/54; 426/623; 426/630; 426/635; 426/807
(58) Field of Search .............................. 426/54, 807, 623, 426/630, 635

(56) References Cited

U.S. PATENT DOCUMENTS

| 4,956,291 | * | 9/1990 | Yamanoke et al. | 435/200 |
| 5,196,069 | | 3/1993 | Cullingford et al. | 127/37 |
| 5,292,410 | * | 3/1994 | Sweeney | 204/131 |

FOREIGN PATENT DOCUMENTS

WO 93/21344    10/1993    (WO).

OTHER PUBLICATIONS

Crillies, 'Animal Feeds From Waste Materials', Noyes Data Corporation, pp 70, 269, 1978.*
Penafiel et al., (1997) *Bioelectromagnetics*, vol. 18, pp. 132–141.
Litovitz et al., (1997) *Bioelectromagnetics*, vol. 18, pp. 422–430.
Parker et al., (1996) *Tetrahedron Letters*, vol. 37, No. 46, pp. 8383–8386.
Horiuchi et al., (1991) *Contributions to Nephrology*, vol. 92, pp. 167–174.
Marani et al., (1990) *European Journal of Morphology*, vol. 28, No. 2–4, pp. 121–131.
Bernat, R., (1985) *ACTA Physiology*, vol. 36, No. 5–6, pp. 360–365.
Spencer et al., (1995) *Journal of medical Microbiology*, vol. 5, No. 2, pp. 265–272.
Lu et al., (1983) *Radiation Research*, vol. 96, No. 1, pp. 152–159.

* cited by examiner

*Primary Examiner*—Chhaya D. Sayala
(74) *Attorney, Agent, or Firm*—McDonnell Boehnen Hulbert & Berghoff

(57) ABSTRACT

A method for enhancing or increasing the metabolisable dietary content of a plant-based animal feed, the method comprising reacting the feed with an enzyme capable of releasing a metabolisable dietary component from the feed under the influence of microwave irradiation such that the metabolisable dietary content of the feed is enhanced or increased.

13 Claims, 1 Drawing Sheet

ENHANCEMENT OF INDUSTRIAL ENZYMES

TECHNICAL FIELD

The present invention relates generally to methods of enhancing enzyme activity by the use of microwave energy.

BACKGROUND ART

Enzymes are proteins or glycoproteins present in all living cells, which control cellular metabolic and catabolic processes. Enzymes are biological catalysts capable of assisting chemical reactions without being incorporated in the end product. Enzymes often have a limited stability (lifetime) and activity can decrease over time.

Enzymes are specific in their action and usually break down or synthesise one particular compound or family of compounds. In some cases, enzyme action is limited to specific chemical bonds in a compound with which they react. Enzymes can act at atmospheric pressure and in mild conditions in respect to temperatures and acidity (pH). Many enzymes function optimally at temperatures of between 20–70° C. and at pH values around neutral (pH 7).

Industrial enzymes are prepared from biological sources and can be modified in order to produce the enzyme required for a particular task. There is a wide range of applications for enzymes having potential industrial uses.

One major use is in the assistance of the digestion process in animals. The enzymes associated with digestion are mostly hydrolytic as they break down large molecules into smaller molecules. These smaller molecules can then be absorbed by the animal's gut and used for cellular maintenance and growth.

A hydrolytic enzyme attaches itself to its substrate to form an enzyme-substrate complex. The substrate is broken into smaller molecules but the enzyme is not changed and can act again with new a substrate molecule.

Examples of other industrial applications of enzymes include biological detergents, textiles for such purposes as finishing of garments and desizing to assist in the weaving process, pulp and paper manufacture, food production including cheese and yogurt, and brewing.

The present inventors have made the surprising discovery that the activity of enzymes in industrial processes can be enhanced by treatment with microwave irradiation.

DISCLOSURE OF INVENTION

In a first aspect, the present invention consists in a method of enhancing an enzyme-catalysed reaction, the method comprising reacting the enzyme with a substrate for the enzyme under the influence of microwave irradiation such that the enzyme reaction is enhanced.

The enzyme may be any enzyme but preferably an industrial enzyme used in industrial or applied processes. In particular, activity of enzymes used in the preparation of food, feed and fodder products can be enhanced by the present invention. Examples of suitable enzymes include, but not limited to, proteases, phytases, phosphatases, carbohydrate hydrolysing enzymes including gluconases, and xylanases.

The present invention is particularly suitable for producing improved animal fodder. The treatment appears to increase the availability of metabolisable components in fodder when ingested by the animal.

The source of substrate may be any plant material, grain or grain products or components. Examples include, but not limited, to cereals like wheat and rice, chaff, hay, silage, brans including rice bran, components thereof, and mixtures thereof.

The invention utilises the use of microwave energy or irradiation to enhance the action of the enzyme upon its substrate. The microwave frequency used in the present invention is in the order of 2.45 Ghz. This frequency is the one available for use in Australia but other frequencies may also be used in the present invention. The amount of energy required is dependent upon the water moisture present within the substrate and the enzyme solution. The energy used is also dependent upon the type of material being treated as compounds can have different dielectric constants. Material with high dielectric constants absorb energy preferentially and are therefore heated or acted upon before compounds with lower dielectric constants. However, other heating mechanism may be used to bring the enzyme solution and substrate up to the activation temperature of the enzyme at which point the microwave application can then be applied.

In a preferred form, the microwave energy is applied such that the temperature of the reaction mixture is effectively controlled. Furthermore, it has been found that it is preferable to apply the microwave energy to the mixture in a continuous manner.

Time of treatment will vary depending on the enzyme, substrate and the volume to be treated. About 10 minutes of microwave treatment has been found to be particularly suitable for rice bran treatment with xylanase.

In a second aspect, the present invention consists in a method for enhancing or increasing the metabolisable dietary content of a food-stuff, the method comprising reacting the food-stuff with an enzyme, the enzyme being capable of releasing a metabolisable dietary component from the food-stuff, under the influence of microwave irradiation such that the metabolisable dietary content of a food-stuff is enhanced or increased.

Preferably, the food-stuff is for an animal, more preferably a domestic animal, and even more preferably a monogastric animal.

The present invention has been found to be particularly suitable for providing improved dietary rice bran for fowl.

In a third aspect, the present invention consists in a food stuff with enhanced metabolisable dietary content produced by the method according to the second aspect of the present invention.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

In order that the invention may be more clearly understood, preferred forms are described with reference to the following examples and drawings.

MODES FOR CARRYING OUT THE INVENTION

EXPERIMENT 1

Figure 1:
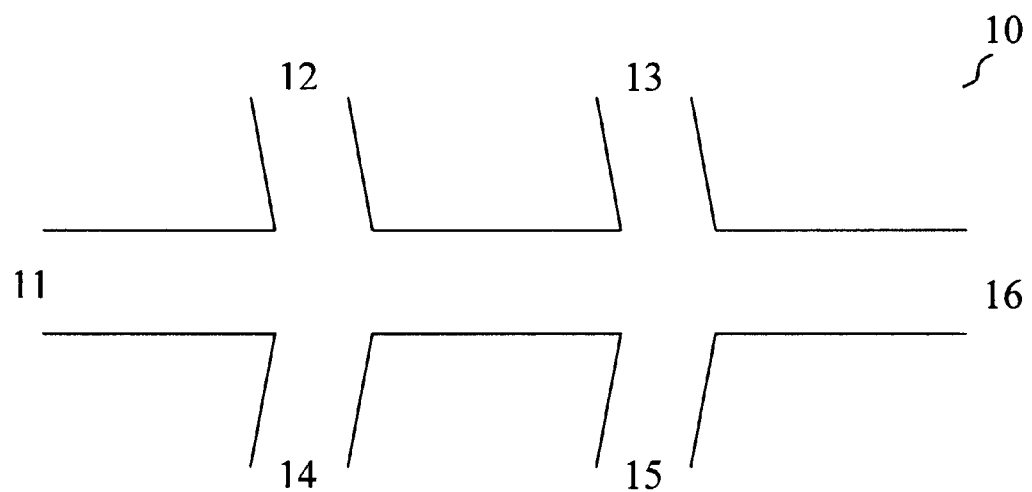
FIG. 1 is a schematic of an apparatus including a pipe applicator for use in applying microwave irradiation to enzyme/substrate mixture.

The effect of microwave treatment on enzymatic treatment of rice bran was studied by measuring the availability or release of sugars. Rice bran is a by-product of rice polishing and consists of the seed coat, the major part of the germ and the outer layer of the kernel. Rice bran is widely used, particularly in south East Asia, as a feed for animal production. Approximately 530 million tonnes of rice bran are produced per annum.

Rice bran contains 20–25% non-starch polysaccharides (NSP) consisting mostly of equal amounts of arabinoxylans and cellulose. NSP are not digested by monogastric animals and are usually not metabolised and passed in the excreta. Rice bran, when used as an animal feed, is thus a relatively poor source of energy and nutrition.

To 50 g of rice bran, 50 mL of water containing the recommended dosage of Enzymes A and B were evenly sprayed using a pressure-spray bottle. The mixture was then subjected to specific microwave energy for 5, 10, 20 and 30 min, respectively. At end of time of treatment, the microwave treatment was enhanced to heat the mixture to 100° C. for 30 seconds to deactivate an enzyme. The samples were then dried at 40° C. in a forced-draught oven. Each sample was replicated 8 times. Determination of free sugars.

Extraction of free sugars. The sample of rice bran was ground to pass through a 0.5 mm screen, and a sample weighing approximately 200 mg was placed in a 30 mL screw-capped culture tube. Five mL of 80% ethanol was then added to the residue and heated to 80° C. for 10 min. The tube was then centrifuged at 2000 g for 10 min. The supernatant containing the free sugars was transferred to an 8 mL vial and dried under nitrogen at 40° C.

Hydrolysis. The residue was hydrolysed for 2 h at 100° C. using 3 mL of 1 M $H_2SO_4$. A 0.4 mL aliquot of hydrolysate was transferred to a 30 mL culture tube to which 0.10 mL of 28% $NH_3$ was added. Alliquots of 50 $\mu$L of Inositol (4 mg/mL) and 50 $\mu$L of allose (4 mg/mL) were added as internal standards. The mixture was dried under nitrogen at 40° C.

Reduction. The monosaccharides were reduced using sodium borohydride as follows: to the mixture of sugar hydrolysate and internal standards, water (0.2 mL) absolute ethanol (0.2 mL), and 3 M ammonia (1 drop) were added. After thoroughly mixing, freshly prepared $NaBH_4$ (prepared by dissolving 50 mg sodium per mL 3M $NH_4OH$) (0.3 mL) was added. The tubes were then capped and incubated in a water bath at 40° C. for 1 h.

Acetylation. To the reduced mixture, 5–7 drops of glacial acetic acid were added to decompose the excess of $NaBH_4$. Then 0.5 mL 1-methylimidazole and 5 mL acetic anhydride were added and mixed, and left for 10 min at room temperature. Absolute ethanol (0.8 mL) was added, mixed and left for 10 min at room temperature to effect acetylation of the sugars. The samples were then placed in an ice bath, and to each tube 5 mL $H_2O$ was added to decompose any excess of acetic anhydride. Five mL of 7.5 M KOH were added, the tubes were capped and gently mixed 6 times by inversion. Another 5 mL of 7.5 M KOH were added, capped and mixed again. At this stage a clear ethyl acetate top layer was visible, this layer was then transferred into a 4 mL vial by using a Pasteur pipette and was evaporated to dryness under nitrogen. The sample was then re-dissolved in 0.4 mL ethyl acetate and the sugars were quantified with a Varian 3400CX gas chromatographic instrument.

RESULTS

Experiment 1a. Both enzyme A and enzyme B released negligible amounts of sugars from rice bran after 24 h of incubation at 40° C. (Table 1).

TABLE 1

The effect of the enzymes on releasing total free sugars in rice bran

| Sample ID Full Fat Rice Bran | Sugars released (g/kg) | Sample ID Defatted Rice Bran | Sugars released (g/kg) |
| --- | --- | --- | --- |
| 2 | 8.15 | 7 | 4.43 |
| 3 | 8.13 | 8 | 9.50 |
| 4 | 6.65 | 9 | 10.10 |
| 5 | 5.76 | 10 | 5.76 |

Experiment 1b. The amounts of sugars released by 5 minutes of microwave treatment were higher than 24 h incubation with the enzyme at 40° C.

Longer periods (up to 30 min) of treatment, however, did not lead to more sugars being released (Table 2).

TABLE 2

The effect of different duration of microwave heating on free sugar release from rice bran.

| Microwave Time (min) | Sugars released (g/kg) |
| --- | --- |
| 5 | 34.80 |
| 10 | 26.72 |
| 20 | 30.62 |
| 30 | 27.72 |

The results demonstrate that depolymerisation of NSP present in rice bran (mainly arabinoxylans and cellulose) by commercial glycanases is not extensive, which confirms the view that the benefits of using enzymes in monogastric diets are not due to a complete breakdown of the NSP and subsequent absorption of the released sugars, but probably due to the ability of the enzymes to partially cleave the soluble NSP, thereby removing their anti-nutritive effects on nutrient digestion and absorption. Microwave treatment enhances this reaction to provide a potentially more nutritious feed stock.

Enzymes require certain amounts of energy in order to act on their respective substrates. Appropriate frequencies of microwave treatment appear to "energise" the enzymes, the net effect of which is an increased activity of the enzymes. Thus, microwave treatment released markedly higher amounts of sugars than normal treatment in the current experiment. Given the very short treatment duration (5–30 min), the effect observed was of great significance.

The results of specific sugar analyses are shown in Table 3. The results show an increase in the release of free sugars by enzyme hydrolysis of rice bran with microwave treatment.

TABLE 3

Specific sugar analyses of treated rice bran

| Sample ID | Microwave Treatment | Moisture Level (%) | Sample Wt (mg) | Sugar to Allose Ratio g/kg | | | | | |
|---|---|---|---|---|---|---|---|---|---|
| | | | | Rham | Fuc | Ara | Xyl | Man | Gal |
| 1 | Domestic Micro (15 min) | 50 | 200 | 0.00 | 0.00 | 0.10 | 0.09 | 0.17 | 0.12 |
| 2 | 5 mins | 100 | 200 | 0.00 | 0.00 | 0.00 | 0.00 | 0.24 | 0.15 |
| 3 | 5 mins | 75 | 200 | 0.00 | 0.00 | 0.00 | 0.00 | 0.29 | 0.15 |
| 4 | 5 mins | 50 | 200 | 0.00 | 0.00 | 0.00 | 0.00 | 0.33 | 0.00 |
| 5 | 5 mins | 25 | 200 | 0.00 | 0.00 | 0.00 | 0.00 | 0.33 | 0.00 |
| 6 | 10 mins | 100 | 200 | 0.00 | 0.00 | 0.11 | 0.10 | 0.77 | 0.17 |
| 7 | 10 mins | 75 | 200 | 0.00 | 0.00 | 0.14 | 0.10 | 0.82 | 0.18 |
| 8 | 10 mins | 50 | 200 | 0.00 | 0.00 | 0.00 | 0.00 | 1.14 | 0.15 |
| 9 | 10 mins | 25 | 200 | 0.00 | 0.00 | 0.00 | 0.00 | 0.94 | 0.16 |
| 10 | 15 mins | 100 | 200 | 0.00 | 0.00 | 0.17 | 0.00 | 0.65 | 0.18 |
| 11 | 15 mins | 75 | 200 | 0.00 | 0.00 | 0.17 | 0.12 | 0.64 | 0.16 |
| 12 | 15 mins | 50 | 200 | 0.00 | 0.00 | 0.10 | 0.00 | 0.58 | 0.15 |
| 13 | 15 mins | 25 | 200 | 0.00 | 0.00 | 0.00 | 0.00 | 0.58 | 0.14 |
| 14 | 20 mins | 100 | 200 | 0.00 | 0.00 | 0.13 | 0.00 | 0.70 | 0.16 |
| 15 | 20 mins | 75 | 200 | 0.00 | 0.00 | 0.12 | 0.00 | 0.64 | 0.15 |
| 16 | 20 mins | 50 | 200 | 0.00 | 0.00 | 0.24 | 0.13 | 0.75 | 0.29 |
| 17 | 20 mins | 25 | 200 | 0.00 | 0.00 | 0.14 | 0.00 | 0.74 | 0.16 |
| 18 | 30 mins | 100 | 200 | 0.00 | 0.00 | 0.00 | 0.00 | 0.45 | 0.15 |
| 19 | 30 mins | 75 | 200 | 0.00 | 0.00 | 1.14 | 0.08 | 0.19 | 0.13 |
| 20 | 30 mins | 50 | 200 | 0.00 | 0.00 | 0.10 | 0.00 | 0.59 | 0.15 |
| 21 | 30 mins | 25 | 200 | 0.00 | 0.00 | 0.00 | 0.00 | 0.58 | 0.14 |

| Sample ID | Microwave Treatment | Sugar to Allose Ratio g/kg TOTAL | | | | | | | | Free Sugars |
|---|---|---|---|---|---|---|---|---|---|---|
| | | Glu | Rham | Fuc | Ara | Xyl | Man | Gal | Glu | |
| 1 | Domestic Micro (15 min) | 1.88 | 0.00 | 0.00 | 0.72 | 0.70 | 1.29 | 0.85 | 14.09 | 17.67 |
| 2 | 5 mins | 2.09 | 0.00 | 0.00 | 0.00 | 0.00 | 1.81 | 1.10 | 15.65 | 18.56 |
| 3 | 5 mins | 2.21 | 0.00 | 0.00 | 0.00 | 0.00 | 2.16 | 1.10 | 18.55 | 19.81 |
| 4 | 5 mins | 1.76 | 0.00 | 0.00 | 0.00 | 0.00 | 2.45 | 0.00 | 13.18 | 15.62 |
| 5 | 5 mins | 1.94 | 0.00 | 0.00 | 0.00 | 0.00 | 2.50 | 0.00 | 14.54 | 17.04 |
| 6 | 10 mins | 4.12 | 0.00 | 0.00 | 0.83 | 0.11 | 5.79 | 1.30 | 30.92 | 38.84 |
| 7 | 10 mins | 4.33 | 0.00 | 0.00 | 1.07 | 0.75 | 6.17 | 1.38 | 32.44 | 41.81 |
| 8 | 10 mins | 5.18 | 0.00 | 0.00 | 0.00 | 0.00 | 8.55 | 1.12 | 38.82 | 48.49 |
| 9 | 10 mins | 5.14 | 0.00 | 0.00 | 0.00 | 0.00 | 7.03 | 1.16 | 38.57 | 46.76 |
| 10 | 15 mins | 4.15 | 0.00 | 0.00 | 1.27 | 0.00 | 4.91 | 1.35 | 31.11 | 38.64 |
| 11 | 15 mins | 3.84 | 0.00 | 0.00 | 1.30 | 0.92 | 4.82 | 1.19 | 28.80 | 37.03 |
| 12 | 15 mins | 0.60 | 0.00 | 0.00 | 0.77 | 0.00 | 4.41 | 1.13 | 27.04 | 33.34 |
| 13 | 15 mins | 3.98 | 0.00 | 0.00 | 0.00 | 0.00 | 4.34 | 1.07 | 29.88 | 35.29 |
| 14 | 20 mins | 4.51 | 0.00 | 0.00 | 0.98 | 0.00 | 5.25 | 1.17 | 33.85 | 41.25 |
| 15 | 20 mins | 4.00 | 0.00 | 0.00 | 0.93 | 0.00 | 4.83 | 1.14 | 29.97 | 36.88 |
| 16 | 20 mins | 4.55 | 0.00 | 0.00 | 1.77 | 1.00 | 5.66 | 2.16 | 34.11 | 44.70 |
| 17 | 20 mins | 4.64 | 0.00 | 0.00 | 1.08 | 0.00 | 5.56 | 1.23 | 34.83 | 42.71 |
| 18 | 30 mins | 3.62 | 0.00 | 0.00 | 0.00 | 0.00 | 3.35 | 1.12 | 27.13 | 31.00 |
| 19 | 30 mins | 2.86 | 0.00 | 0.00 | 8.58 | 0.63 | 1.44 | 0.96 | 21.45 | 33.05 |
| 20 | 30 mins | 3.60 | 0.00 | 0.00 | 0.77 | 0.00 | 4.41 | 1.13 | 27.04 | 33.34 |
| 21 | 30 mins | 3.98 | 0.00 | 0.00 | 0.00 | 0.00 | 4.34 | 1.07 | 29.88 | 35.29 |

EXPERIMENT 2

An experiment outlining the effectiveness of the present invention is detailed below. A feed product, rice bran was chosen as the base product.

Methods

Rice bran was obtained from a local feed supplier and was treated as follows:

(a) Treatment 1. Rice bran (7 kg)+7 L of water, continuous stirring for 48 h at 25° C. The bran was then dried at 45° C. and hammer-milled to pass a 1 mm screen. This product was designated RB+s.

(b) Treatment 2. Rice Bran+Enzyme (Biofeed Plus)+7 L of water, continuous stirring for 48 h at 25° C. The mixture was then dried at 45° C. and hammer-milled to pass a 1 mm screen. This product was designated RB+E+s.

(c) Treatment 3. Rice Bran+Enzyme (Biofeed Plus)+Microwave. This product was designated RB+E+MV.

(d) Treatment 4. Rice Bran (30%)+Enzyme (Biofeed Plus)+7 L of water, continuous stirring for 48 h at 25° C. and was microwaved. The mixture was then dried at 45° C. and hammer-filled to pass a 1 mm screen. This product was designated RB+E+MV+s.

After preparation of the various rice bran materials, six experimental type diets were formulated a fixed level of 30% rice bran in each diet in a 2×3 factorial design (2 treatments: ±soaking; 3 diets; control, enzyme, enzyme+Microwave).

The experiment constituted of a trial on 144, 21 day old broiler chickens. The trial consisted of six diet variations being:

Diet 1 Normal rice bran—no microwave treatment (control)

Diet 2 Rice bran soaked in water with no enzyme for 48 hours

Diet 3 Rice bran+enzyme—no soaking

Diet 4 Rice bran+water+enzyme soaked for 48 hours

Diet 5 Rice bran+enzyme+microwave treatment

Diet 6 Rice bran+enzyme+microwave treatment+soaking for 48 hours

Diets

All ingredients were accurately weighed and thoroughly mixed in a rotary mixer. The enzyme (11.2 L) was diluted in 300 mL water and sprayed in to the ingredients using the pressure-spray bottle during feed mixing. The diets were cold-pelleted. One hundred and forty four 21-day old broiler chicks were transferred to slide-in cages with six (6) replicates of four (4) birds. The birds were allocated in groups of approximately equal liveweights. The first three days enabled the chickens to adapt to the feeds. During the following four days, all excreta were collected daily, dried overnight at 80° C. and pooled for gross determination. Feed intakes were measured over the final 7-day period. At the end of the trial, bird weights were recorded and feed conversation ratio (FCR) calculated. The amount of feed consumed during the excreta collection period was also recorded.

All soaking treatments were at 25° C. for 48 hours. Diet 3 (Rice brain+enzyme) was taken to 68° C. for 10 minutes. All microwave treatments were at 2.45 Ghz for 10 minutes at 68° C. Each diet trial consisted of six (6) replicates of four (4) birds each. The enzyme consisted of xylanase and diluted to the recommended concentration of 11.2 mL in 300 mL of water for application. Four criteria were measured; Apparent Metabolisable Energy (AME), Feed Conversion ratio (FCR), Weight Gain (WG), and Feed Intake (FI).

The results of the trial are shown in Table 4.

TABLE 4

Feeding trial results

| Diet | AME (Mj/kg) | FCR (feed grain) | WG (g/d/b) | FI (g/d/b) |
| --- | --- | --- | --- | --- |
| Diet 1 | 11.89 | 2.392 | 32.1 | 79.5 |
| Diet 2 | 11.87 | 2.135 | 39.7 | 83.5 |
| Diet 3 | 13.01 | 2.324 | 33.9 | 78.3 |
| Diet 4 | 11.82 | 2.294 | 37.5 | 84.0 |
| Diet 5 | 13.61 | 2.331 | 39.0 | 89.5 |
| Diet 6 | 12.66 | 2.178 | 43.4 | 92.4 |

The directly comparable results are those of Diet 3 and Diet 5 where the only difference was the source of energy. In Diet 3 the source of heat was a conventional laboratory oven while Diet 5 consisted of microwave energy for the same time duration. This clearly demonstrates an improvement in AME of 4.61%.

This invention has immediate application potential in enhancing the AME of other high-NSP feed ingredients such as wheat pollard, wheat bran and grain legumes. It will be appreciated, however, that the present invention is not limited to these potential applications and may be used in other industrial applications where both the effect of the enzyme is desirous to be improved and/or reduce the time taken to achieve the desired effect.

APPARATUS

FIG. 1 shows a schematic representation of an apparatus suitable for carrying out the methods according to the present invention. The apparatus includes a microwave applicator 10, and energy wave guides 12, 13, 14 and 15. The microwave energy is applied to an enzyme/substrate mixture in the apparatus as described above. A pipe applicator 17 is provided with an inlet 11 through which substrate, together with an enzyme mixture enters the applicator. The pipe applicator 17 is also provided with an outlet 16 through which the enzyme-treated product exits the applicator 10.

This apparatus shown in FIG. 1 is suited to high volume, continuous processing applications.

Figure 2:
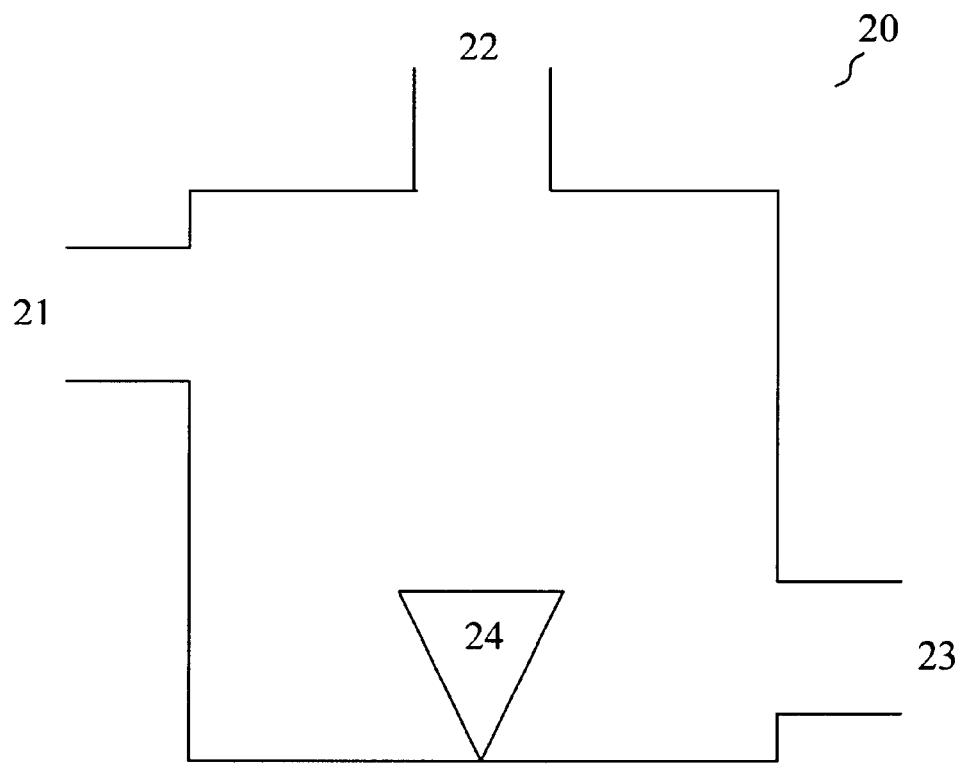
FIG. 2 is a schematic of an apparatus including a mixture drum applicator for use in applying microwave irradiation to enzyme/substrate mixture.

FIG. 2 shows a schematic representation of an other apparatus suitable for carrving out the methods according to the present invention. The apparatus includes a mixing drum applicator 20 in which mixing or stirring is applied via a paddle instrument 24. The microwave energy is applied via an energy wave guide 22. The microwave energy and can be applied to an enzyme/substrate mixture in a manner as described above. The apparatus includes an inlet 21 through which the substrate together with the enzyme mixture, are added to the apparatus. The apparatus includes an outlet 23 through which the enzyme-treated substrate exits the apparatus.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of enhancing or increasing metabolizable dietary content of a plant-based animal feed, the method comprising:

a) adding to a plant-based animal feed an enzyme capable of releasing a metabolizable dietary component from the feed to form a feed/enzyme mixture; and b) irradiating the feed/enzyme mixture with microwave energy for sufficient time to enhance or increase the metabolizable dietary content of he feed without causing substantial enzymatic modification or catalysis of the feed prior to consumption by the animal.

2. The method according to claim 1 wherein the feed is selected from the group consisting of cereal, chaff, hay, silage, bran, components thereof, and mixtures thereof.

3. The method according to claim 2 wherein the feed is rice bran.

4. The method according to claim 1 wherein the enzyme is selected from the group consisting of protease, phytase, phosphatase, carbohydrate hydrolyzing enzymes, xylanase, and mixtures thereof.

5. The method according to claim 4 wherein the enzyme is xylanase.

6. The method according to claim 1 wherein microwave energy has a frequency in the order of 2.45 GHz.

7. The method according to claim 1 wherein irradiating with microwave energy is carried out such that the temperature of the feed/enzyme mixture is effectively controlled.

8. The method according to claim 7 wherein irradiating with microwave energy is carried out in a continuous manner.

9. The method according to claim 8 wherein irradiating with microwave energy is carried out for about 10 minutes.

10. The method according to claim 1 wherein irradiating with microwave energy is carried out at atmospheric pressure.

11. A plant-based animal feed having enhanced metabolizable dietary content produced by:
   a) adding to a plant-based animal feed an enzyme capable of releasing a metabolizable dietary component from the feed to form a feed/enzyme mixture; and
   b) irradiating the feed/enzyme mixture with microwave energy for sufficient time to enhance or increase the metabolizable dietary content of the feed without causing substantial enzymatic modification or catalysis of the feed prior to consumption by the animal.

12. The plant-based animal feed according to claim 11 wherein the feed is suitable for a monogastric animal.

13. The plant based animal feed according to claim 12 wherein the monogastric animal is a fowl.

* * * * *